United States Patent [19]
McCurdy et al.

[11] Patent Number: 5,725,956
[45] Date of Patent: *Mar. 10, 1998

[54] METHOD AND MATERIAL FOR PROTECTING GLASS SURFACES

[75] Inventors: Richard J. McCurdy, Toledo; Kenneth J. Heater, Westerville; Alice B. Parsons, Pataskala; J. David Robbins, Worthington, all of Ohio

[73] Assignee: Libbey-Owens-Ford Co., Toledo, Ohio

[*] Notice: The term of this patent shall not extend beyond the expiration date of Pat. No. 5.

[21] Appl. No.: 529,502

[22] Filed: Sep. 18, 1995

Related U.S. Application Data

[63] Continuation-in-part of Ser. No. 170,532, Dec. 20, 1993, Pat. No. 5,451,457.

[51] Int. Cl.[6] ............................................. B32B 17/10
[52] U.S. Cl. ........................... 428/441; 428/426; 428/442
[58] Field of Search ........................... 428/426, 441, 428/432, 442; 427/180

[56] References Cited

U.S. PATENT DOCUMENTS

| | | | |
|---|---|---|---|
| 2,995,533 | 8/1961 | Parmer et al. | 524/143 |
| 4,011,359 | 3/1977 | Simpkin et al. | 428/326 |
| 4,447,496 | 5/1984 | Franz et al. | 428/432 |
| 4,489,106 | 12/1984 | Duffer et al. | 427/154 |

*Primary Examiner*—D. S. Nakarani
*Attorney, Agent, or Firm*—Marshall & Melhorn

[57] ABSTRACT

A method and material is disclosed for protecting glass surfaces in a stack of glass sheets by applying an interleaving material comprised of a high molecular weight polymer having a number average molecular weight of at least 200,000 to one or both major surfaces of the glass sheets. The glass sheets are then stacked in face-to-face relation for shipment or storage.

9 Claims, No Drawings

METHOD AND MATERIAL FOR PROTECTING GLASS SURFACES

RELATED APPLICATION

This application is a continuation-in-part of U.S. application Ser. No. 08/170,532, filed Dec. 20, 1993, now U.S. Pat. No. 5,451,457.

FIELD OF THE INVENTION

The present invention relates generally to a method and material for separating glass sheets and protecting them from marring during storage and shipment, particularly when stacked in a conventional manner. In particular, the present invention relates to the application of a mechanical interleaving material to pyrolytically coated glass sheets, e.g., sheets having a pyrolytically deposited metal oxide and/or silicon-containing coating thereon, prior to stacking. References in this specification to "stacked glass sheets" are to be understood as referring to an assembly of glass sheets whose major surfaces are in adjacent face-to-face relationship.

BACKGROUND OF THE INVENTION

During the storage and transit of stacked glass sheets, a common problem is the deterioration in the quality of the surfaces of the glass sheets. In particular, relative movement between adjacent sheets is liable to cause marring of the adjacent glass surfaces. Marring is a particular problem when stacking glass sheets having pyrolytically deposited coatings thereon.

It is generally known in the art to separate adjacent glass surfaces by interposing sheets of paper between the sheets of glass to protect the glass surfaces. However, techniques that utilize paper interleaving are time consuming and costly. Less expensive methods suggested for separating glass sheets involve the use of particulate interleaving materials, which may include natural products such as wood flour and ground corncobs, or synthetic products such as polyethylene, polystyrene or polyacrylate beads, to name a few. Poly(methyl methacrylate) is currently the predominant material used by the glass industry as an interleaving material.

While the synthetic particulate interleaving materials provide a measure of mar protection at relatively low cost, they are sometimes not sufficient to prevent marring on particular glass products, especially pyrolytically coated glass. For instance, pyrolytic coatings of tin oxide, particularly relatively thick ones, are very susceptible to marring, due to their relatively rough surface topography. Such pyrolytic coatings are commonly utilized, for example, in multiple sheet or insulating glass products, and are described further in U.S. Pat. Nos. 4,146,657 and 4,187,336 to Gordon. It would therefore be desirable to provide a method and material for separating stacked glass sheets coated with this material which prevents marring and which is compatible with normal production practices in the glass industry.

As noted above, polyethylene has previously been suggested as a possible interleaving material. For example, U.S. Pat. No. 4,011,359 to Simpkin et al discloses an interleaving material for separating glass sheets and protecting them from scratching and staining. The material comprises a porous, finely divided support material, impregnated with a weakly acidic material, and fine particles of a chemically inert plastic material. The inert plastic separator material may be polyethylene, polystyrene, polytetrafluoroethylene or a methacrylate polyester, and preferably has a larger particle size than the acid-impregnated support material. The interleaving material may be applied to the glass by conventional powder applicators.

U.S. Pat. No. 4,447,496 to Franz et al discloses a method of protecting glass surfaces by the treatment of the glass surfaces with an organotin compound prior to the application of a particulate interleaving material. While various interleaving materials, such as polyethylene, polystyrene, polytetrafluoroethylene and polyacrylate are suggested, Franz et al indicate that porous cellulose materials such as wood flour are preferred.

U.S. Pat. No. 2,995,533 to Parmer et al discloses a protective coating for glassware which is subjected to abrasive contact with other glassware during handling or shipment. An aqueous emulsion of polyethylene is applied to the glassware. It is noted that the molecular weight of the polyethylene can be as high as 2,000.

While the above materials do provide a measure of protection to normal clear glass, they fail to provide protection to pyrolytic coatings, particularly relatively thick coatings of tin oxide, e.g., so called Low-E coatings. It would therefore be desirable to supply a method and material for interleaving both uncoated and pyrolytically coated glass sheets which provides superior resistance to marring during storage or transportation of the glass sheets. In addition, it is desirable for the method and material to prevent the development of low pressures, or even a vacuum, between the stacked glass sheets which may inhibit unloading of the stacked glass sheets.

It must be noted that the prior art referred to hereinabove has been collected and examined only in light of the present invention as a guide. It is not to be inferred that such diverse art would otherwise be assembled absent the motivation provided by the present invention.

SUMMARY OF THE INVENTION

The present invention provides a method and material for protecting a glass surface from marring during shipment or storage of stacked glass sheets. An interleaving material comprised of a high molecular weight polymer or mixtures of such polymers having a number average molecular weight of at least 200,000 is applied to one or both major surfaces of the glass sheets. As examples of such polymers may be mentioned ultra-high molecular weight polyethylene and poly(methyl methacrylate). The glass sheets are then stacked in face-to-face relation for shipment or storage.

The interleaving material in accordance with the present invention provides superior resistance to marring compared to prior art particulate interleaving materials, along with the dimensional stability and impact resistance required to prevent the development of a vacuum between the stacked glass sheets.

DETAILED DESCRIPTION OF THE PREFERRED EMBODIMENTS

In accordance with the invention, glass sheets are provided with a high molecular weight polymer interleaving material, for example ultra-high molecular weight polyethylene, prior to stacking in a face-to-face relation. It has been determined, however, that a polyethylene having a number average molecular weight less than 200,000 still resulted in significant marring of a pyrolytically coated, specifically tin-oxide coated, glass sheet. In addition, these relatively low molecular weight polyethylenes were found to transfer material to the coated glass surface under the high loads experienced by an interleaving material in a typical arrangement of stacked glass sheets.

Accordingly, the interleaving material of the present invention is comprised of a high molecular weight polymer having a number average molecular weight of at least 200,000. Preferably, the number average molecular weight of the interleaving material is at least 1,000,000. If the molecular weight of the polymer is less than 1,000,000, it is preferred that the polymer have a relatively high density. In a most preferred embodiment, the number average molecular weight of the interleaving material is in the range of about 3 million to 6 million. The interleaving material of the invention thus preferably exhibits excellent toughness, abrasion resistance, resistance to stress cracking and low moisture absorption, while retaining a low coefficient of friction.

These properties have been found to be critical in an interleaving material, especially when used with pyrolytically coated glass sheets. This is because the marring of tin-oxide coated glass sheets by, for example, a poly(methyl methacrylate) interleaving material of less than the desired high molecular weight is believed to be caused by a thin deposit of the poly(methyl methacrylate) on the tin-oxide coated surface, the marring sites having been identified by secondary ion mass spectrometry as poly(methyl methacrylate). In addition, electron microscopy of tin-oxide coated surfaces previously marred by a low molecular weight poly(methyl methacrylate) interleaving material fails to reveal any scratching of the surface.

The interleaving material in accordance with the invention may be a continuous film or sheet but preferably is formed of particles having an average size of between about 20 to 300 microns, preferably about 100 to 300 microns, and the particles may be of any suitable shape. The particles may be larger than 300 microns, as long as a substantial portion of the particles do not settle to the bottom of a vertically disposed stack of glass sheets. The interleaving material may be formed of powder ground to the required size. From the standpoint of dimensional stability, it is preferable to form the interleaving material of generally spherical beads, although there may be production difficulties in forming polyethylene in these molecular weight ranges into generally spherical beads. The particle size should be large enough to provide sufficient separation between the stacked glass sheets to maintain the glass sheets in spaced-apart relationship and prevent the development of a vacuum between adjacent sheets. A size range of 20 microns to 300 microns satisfy these requirements.

Further, even those polymers having number average molecular weights greater than 1,000,000, will undergo plastic deformation under static loads over time. Where the stacked glass sheets will remain in that arrangement for a relatively long time, the load on the polymer particles may cause some deformation, reducing the separation between adjacent glass sheets to the extent that a vacuum will develop. Thus, in a most preferred embodiment, the average particle size is between about 150 microns and 300 microns, to allow for some deformation during long periods of storage and shipment.

The high molecular weight interleaving materials used in accordance with the invention, while providing improved resistance to marring, will not protect against the staining which may occur with pyrolytically coated stacked glass sheets. Therefore, the glass sheets are still treated with a conventional stain inhibitor, preferably an acid material. One preferred acid is adipic acid. The quantity of acid applied need only be enough to provide adequate stain protection to the glass surface.

A preferable method for the application of the acid material is by spraying an aqueous solution onto the surface of a glass ribbon during a float glass manufacturing process. For pyrolytically coated glass, the stain inhibitor is preferably applied to the coated surface.

The high molecular weight interleaving material may be applied to either major surface of the glass sheets in any suitable manner, either before or after the application of the stain inhibitor. Preferably, the interleaving material is electrostatically charged and dispersed on the surface of a glass ribbon during a float glass manufacturing process at a point where the glass ribbon is at or near ambient temperature. For pyrolytically coated glass, the interleaving material is also preferably applied to the coated surface.

The invention is more easily comprehended by reference to specific embodiments which are representative of the invention. It must be understood, however, that the specific embodiments are provided only for the purpose of illustration, and that the invention may be practiced otherwise than as specifically illustrated without departing from its spirit and scope.

EXAMPLE I

Sheets of annealed soda-lime-silica glass were formed having a tin oxide coating deposited thereon and cut into 4"×8" sheets. The tin oxide coated surface of the glass sheets was dusted with a ground powder of the various interleaving materials to be tested at a rate of about 140 mg/ft$^2$. Two sheets at a time were mounted to a table and an uncoated glass sheet was placed over the samples. A 125 lbs. load was placed on the uncoated glass sheet, which was then moved relative to the samples for 250 strokes each ³⁄₁₆" in length. Each sample was then washed in a conventional commercial glass washing machine using a water and detergent wash and a water rinse.

Eight samples were tested for each interleaving material, and the number of samples showing any marring was recorded. In addition, the total number of marred sites for each interleaving material was recorded. These results are shown in the Table below.

| MATERIAL | # OF SAMPLES | # OF SAMPLES WITH MARRING | TOTAL # OF MARRED SITES |
|---|---|---|---|
| HB 312 CM[1] | 8 | 3 | 3 |
| HOSTALLOY 731[2] | 8 | 2 | 2 |
| DOW HDPE TYPE 1V — 10062N[3] | 8 | 4 | 11 |
| LDPE NA814-000[4] | 8 | 5 | ENTIRE SAMPLES MOTTLED |

[1] Ultra-high molecular weight polyethylene, 3 million to 6 million, available from HIMONT Incorporated.
[2] Ultra-high molecular weight polyethylene, 3 million to 6 million, available from Hoechst-Celanese.
[3] High density polyethylene, number average molecular weight in the range of 150,000 to 350,000, available from Dow Plastics.
[4] Low density polyethylene, number average molecular weight in the range of 70,000 to 90,000, available from Quantum Chemicals.

For comparison, identical glass samples were produced and dusted with poly(methyl methacrylate) of number average molecular weight less than 200,000 and tested in the same manner as above. Eight out of eight such samples exhibited heavy mottling over most of the sheet.

EXAMPLE II

Two sheets of annealed soda lime silicate glass were formed having a tin oxide coating deposited thereon and cut into 10"×12" sheets. The sheets were mounted in face to face relation with the interleaving material in powder form being dispersed between the coated face of the top sheet and the uncoated face of the bottom sheet. A 20 Kg load was applied to the top sheet and the two sheets were then oscillated relative to each other for a period of 30 minutes. Each sheet was then washed with deionized water in a washing machine, visually assessed and then given a rating out of 10. It has been found in practice that a rating of 4 is on the border of acceptability. The results are shown in the table below:

| MATERIAL | VISUAL ASSESSMENT | RATING |
| --- | --- | --- |
| HB320[1] + adipic acid | Fault free surface | 10 |
| TS1192/1[2] + adipic acid | Occasional light marking present | 8 |
| TS1647[3] + adipic acid | Surface rub marks fairly visible | 6½ |
| TS1692[4] + adipic acid | Surface smear patches visible | 6 |
| Standard PMMA[5] + fine adipic (60 mesh) | Light streaking visible with occasional heavy rub mark | 4 |

[1] HB320: high molecular weight polyethylene, 3–6 Million, available from HIMONT Incorporated.
[2] TS1192/1: high molecular weight poly(methyl methacrylate), number average molecular weight of 667,415, available from Bonar Polymers, County Durham, England.
[3] TS1647: high molecular weight poly(methyl methacrylate), number average molecular weight of 492,524, available from Bonar Polymers, County Durham, England.
[4] TS1692: high molecular weight poly(methyl methacrylate), number average molecular weight greater than 200,000, available from Bonar Polymers, County Durham, England.
[5] Standard PMMA: poly(methyl methacrylate) number average molecular of 198,000, available from Bonar Polymers, County Durham, England.

What is claimed is:

1. An article of manufacturing comprising:

a) a plurality of glass sheets; and b) an interleaving material interposed between said glass sheets, said interleaving material being comprised of a high molecular weight polymer having a number average molecular weight of at least 200,000.

2. The article according to claim 1, wherein the interleaving material is ultra-high weight polyethylene having a number average molecular weight of at least 1,000,000.

3. The article according to claim 1, wherein the interleaving material is poly(methyl methacrylate) having a number average molecular weight of at least 600,000.

4. The article according to claim 1, wherein the interleaving material has a number average molecular weight of at least about 3,000,000.

5. The article according to claim 1, wherein the interleaving material is a particulate having an average particle size sufficient to maintain the first glass sheet and the second glass sheet in spaced-apart relationship.

6. The article according to claim 5, wherein the interleaving material has an average particle size of at least 20 microns.

7. The article according to claim 6, wherein the interleaving material has an average particle size of between about 100 to 300 microns.

8. The article according to claim 1, further comprising a coating of a stain inhibitor interposed between said glass sheets.

9. The article according to claim 8, wherein the stain inhibitor is adipic acid.

* * * * *

UNITED STATES PATENT AND TRADEMARK OFFICE
CERTIFICATE OF CORRECTION

PATENT NO. : 5,725,956
DATED : MARCH 10, 1996
INVENTOR(S) : RICHARD D. McCURDY ET AL.

It is certified that error appears in the above-identified patent and that said Letters Patent is hereby corrected as shown below:

TITLE PAGE, ITEM [*] NOTICE, CHANGE "5," TO --5,451,457--.

Signed and Sealed this

Sixteenth Day of March, 1999

Attest:

Q. TODD DICKINSON

Attesting Officer

Acting Commissioner of Patents and Trademarks